US012669067B2

(12) United States Patent　　　　　(10) Patent No.:　US 12,669,067 B2

Rahim et al.　　　　　　　　　　　　　(45) Date of Patent:　Jun. 30, 2026

(54) SYSTEMS AND METHODS FOR IMPROVED TRANSIENT RESPONSE OF TURBINE GENERATORS

(71) Applicant: General Electric Company, Schenectady, NY (US)

(72) Inventors: Muhammed Buksh Nurur Rahim, Spring, TX (US); Miroslaw Pawel Babiuch, Julianów (PL); Andrejs Svalovs, Rütihof (CH)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 397 days.

(21) Appl. No.: 18/216,942

(22) Filed: Jun. 30, 2023

(65) Prior Publication Data

US 2024/0401498 A1　　Dec. 5, 2024

(30) Foreign Application Priority Data

Jun. 5, 2023　(PL) .......................................... 445126

(51) Int. Cl.
| | |
|---|---|
| *F01D 21/14* | (2006.01) |
| *F01D 15/10* | (2006.01) |
| *H02P 9/10* | (2006.01) |

(52) U.S. Cl.
CPC ............. *F01D 21/14* (2013.01); *F01D 15/10* (2013.01); *H02P 9/105* (2013.01)

(58) Field of Classification Search
CPC ........... F01D 21/14; F01D 15/10; H02P 9/105
See application file for complete search history.

(56) References Cited

U.S. PATENT DOCUMENTS

| | | | | |
|---|---|---|---|---|
| 3,848,138 | A | 11/1974 | Park | |
| 11,056,989 | B1 * | 7/2021 | Desabhatla | ............... F02C 9/00 |
| 11,459,961 | B2 | 10/2022 | Duscha | |
| 2007/0132249 | A1 * | 6/2007 | Andrew | .................... F01K 3/00 |
| | | | | 290/52 |
| 2008/0071427 | A1 * | 3/2008 | Szepek | ..................... F02C 9/46 |
| | | | | 60/773 |

(Continued)

FOREIGN PATENT DOCUMENTS

| | | |
|---|---|---|
| CN | 101170256 A | 4/2008 |
| CN | 108964123 A | 12/2018 |

OTHER PUBLICATIONS

European extended search report for EP Application No. 24175856.4 dated Dec. 11, 2024, 7 pages.

(Continued)

*Primary Examiner* — Mong-Shune Chung

(74) *Attorney, Agent, or Firm* — Fletcher Yoder, P.C.

(57)　　　　　　　ABSTRACT

A system includes a control system. The control system includes a memory that stores a mechanical power system stabilizer (MPSS) system configured to dynamically stabilize an operation of a generator system by adjusting a gas turbine system, wherein the generator system is mechanically coupled to the gas turbine system. The control system includes a processor connected to the memory and configured to execute the MPSS so that the MPSS detects a transient event caused by a power grid that is electrically coupled to the generator system. The MPSS also mechanically deloads the gas turbine system, waits until a clearing time has elapsed, and mechanically load the gas turbine system.

20 Claims, 5 Drawing Sheets

(56)　　　　　　References Cited

U.S. PATENT DOCUMENTS

| 2015/0200615 A1* | 7/2015 | Desabhatla | ............ H02P 9/105 |
| | | | 322/19 |
| 2016/0348593 A1* | 12/2016 | Oliverio | .................... F02C 9/54 |
| 2021/0104965 A1* | 4/2021 | Gutierrez | ................ H02P 9/105 |
| 2021/0281078 A1* | 9/2021 | Desabhatla | .............. F02C 6/00 |

OTHER PUBLICATIONS

K. Oki, et al.; "Fast Cut Back Control in Thermal Power Plangs"; 5th IFAC Symposium on Modelling and Control in Biomedical Systems 2003, Melbourne, Australia, Aug. 21-23, 2003, vol. 31, No. 28, Sep. 1, 1998 (Sep. 1, 1998 ), pp. 39-43, XP093228919, ISSN: 1474-6670, DOI: 10.1016/S1474-6670(17)38471-9.

\* cited by examiner

SYSTEMS AND METHODS FOR IMPROVED TRANSIENT RESPONSE OF TURBINE GENERATORS

CROSS-REFERENCE TO RELATED APPLICATION

This application claims priority to and benefit of Polish Application No. P.445126, filed on Jun. 5, 2023; entitled "SYSTEMS AND METHODS FOR IMPROVED TRANSIENT RESPONSE OF TURBINE GENERATORS", which is herein incorporated by reference in its entirety.

BACKGROUND

The subject matter disclosed herein relates to turbine systems, and more specifically to improved transient response of turbine generators.

Certain power production systems may include generators and distributed generators that may be powered by turbine systems, such as gas turbine systems. The gas turbine systems may, for example, provide motive power suitable for rotating the generators and thus producing electrical power. The turbine systems and generator systems may include one or more controller suitable for providing a variety of control functions, such as the control of gas turbine speed, load, generator voltage, reactive power flow, and the overall stability of the power production system. During operations, the power production system may be electrically coupled to a power grid, such as a city or municipal power grid. However, under certain operating conditions of the power grid, transient conditions may occur. It would be beneficial to improve the handling of the transient conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes a control system. The control system includes a memory that stores a mechanical power system stabilizer (MPSS) system configured to dynamically stabilize an operation of a generator system by adjusting a gas turbine system, wherein the generator system is mechanically coupled to the gas turbine system. The control system includes a processor connected to the memory and configured to execute the MPSS system so that the MPSS system detects a transient event caused by a power grid that is electrically coupled to the generator system. The MPSS system also mechanically deloads the gas turbine system, waits until a clearing time has elapsed, and mechanically loads the gas turbine system.

A non-transitory computer-readable medium having computer executable code stored thereon, the code comprising instructions to execute a mechanical power system stabilizer (MPSS) system configured to dynamically stabilize an operation of a generator system by adjusting a gas turbine system, wherein the generator system is mechanically coupled to the gas turbine system. The MPSS system detects a transient event caused by a power grid that is electrically coupled to the generator system. The MPSS system also mechanically deloads the gas turbine system, waits until a clearing time has elapsed, and mechanically loads the gas turbine system.

A system includes a gas turbine system configured to convert a fuel into rotative power, and a gas generator system mechanically coupled to the gas turbine system and configured to generate an electric power based on the rotative power. The system further includes a gas turbine controller. The gas turbine controller is configured to detect a transient event caused by a power grid that is electrically coupled to the generator system, and to mechanically deload the gas turbine system. The gas turbine controller is further configured to wait until a clearing time has elapsed and to mechanically load the gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
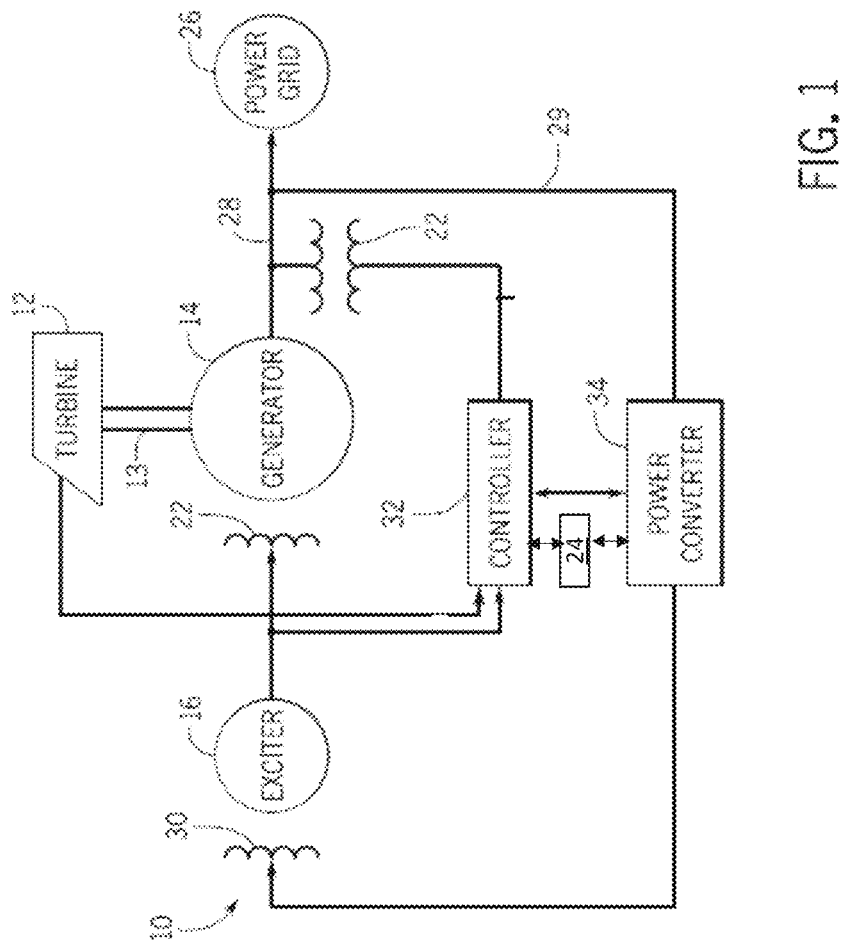
FIG. 1 is a block diagram of an embodiment of a power production system having a gas turbine system mechanically coupled to an electric generator system.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for dynamic mechanical control of damping of, for example, generator power angle oscillations that may occur during transient conditions of a power grid. Particularly, a mechanical power system stabilizer (MPSS) system is provided to continuously and adaptively determine whether to apply certain mechanical control to a gas turbine system during transient conditions that may be experienced by a power grid. For example, 3-phase shorts may be experienced by the power grid, thus causing a transient condition. Likewise, electricity generation due to renewable energy sources (e.g., wind, solar, and the like) can cause a power generation system to lose inertia by affecting frequency changes in the grid (e.g., transient conditions). Thus, when sources of transient conditions cause particular transient changes (e.g., above or below a threshold value), less synchronous inertia is present and increased rate of change of frequency conditions may result.

In some cases, transients (transient conditions) that exceed one or more parameters (threshold values, such as frequency changes of a certain amount and/or frequency changes of a certain amount in a given period of time) may cause the MPSS system to actively dampen transients of a particular type (e.g., first swing transients) via mechanical control of the gas turbine system, e.g., by controlling the rotation of the gas turbine and hence the rotation of an electric generator mechanically coupled to the gas turbine. By mechanically controlling the power generation system, the MPSS system may reduce voltage instability/overshoots/undershoots at generator terminals, which may result in preventing trip levels that may have led to unwanted issues in the power system and/or grid voltage.

Accordingly, a power production system that includes a MPSS system may operate to dynamically detect transients quickly (e.g., in less than 50 ms), determine whether the transients exceed one or more threshold values, and mechanically provide for transient response suitable for overcoming the transient condition (e.g., respond for 1, 5, 10, 15 seconds or more until the transient passes). This may enhance the voltage stability of the power system to which the power grid is connected. Thus, the MPSS system operating with dynamic capabilities to execute certain control operations that mechanically adjust the gas turbine (and connected electric generator) based upon detected transients enhances the voltage stability of the power system it is connected to by, for example, maintaining a generator terminal voltage close to its nominal operational value. This may avoid the voltage instability/overshoots or undershoots at the generator terminals of power system as well as, for example, avoid gas turbine trips (and associated issues) otherwise caused due to sudden transient conditions.

As used herein, "mechanical power system stability" may refer at least to the ability of a power system and associated components (e.g., grid, generators, turbines, and so forth) described herein to transition from, for example, a steady-state operating point (e.g., nominal operating point) to, for example, one or more other mechanical operating points (e.g., valve settings, throttle settings, guide vane settings, pump settings) following a perturbation, a disturbance, or other undesired impact to the power grid.

With the foregoing in mind, it may be useful to describe an embodiment of a power generating system, such as an example power generating system 10 illustrated in FIG. 1. The power generating system 10 may include various subsystems such as a turbine 12, a generator 14, and an exciter 16. The turbine 12 (e.g., gas turbine, steam turbine, hydro turbine, and the like) may be coupled the generator 14 via a shaft 13. In some embodiments, the gas turbine 12 is an aeroderivative gas turbine having lighter weight, and hence less inertial mass, when compared to a non-aeroderivative gas turbine version. The generator 14 may be in turn communicatively coupled to the generator exciter 16. The exciter 16 may provide a direct current (DC) to field windings 22 of the generator 14. Particularly, the exciter 16 may provide a DC field current (e.g., the current utilized by the field windings 22 of the generator 14 and/or other synchronous machine to establish a magnetic field for operation) to excite the magnetic field of the generator 14. For example, the exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant.

The power generating system 10 may also include an excitation system 24, which may provide various control parameters to each of the generator 14 and/or the exciter 16 for example, based on measured parameters and/or indications of measured parameters received at one or more inputs to the excitation system 24. In certain embodiments, the excitation system 24 may function as an excitation control for the generator 14 and the exciter 16. The excitation system 24 may also function as an automatic voltage regulator (AVR) for automatically maintaining generator 14 output terminal voltage at a set value under varying load and operating temperatures. The excitation system 24 may include one or more controllers 32 and one or more power converters 34. The power converter 34 may include a subsystem of integrated power electronic switching devices such as silicon-controlled rectifiers (SCRs), thyristors, insulated gate bipolar transistors (IGBTs), and so forth, that receive alternating current (AC) power, DC power, or a combination thereof from a source such as, for example, the power grid 26. The excitation system 24 may receive this power via a bus 29, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, loading frequency, torque, speed, acceleration, and so forth). As an example, in one embodiment, the excitation system 24 may be an excitation controller system, such as the EX2100e™ regulator, available from General Electric Co. of Schenectady, New York.

In certain embodiments, the power grid 26, and by extension, the turbine 12 and the generator 14 may be susceptible to certain disturbances due to, for example, transient loss of power generation by the generator 14, power line 28 switching, load changes on the power grid 26, electrical faults on the power grid 26, and so forth. Such disturbances may cause the operating frequencies (e.g., approximately 50 Hz for most countries of Europe and Asia and approximately 60 Hz for countries of North America) of the turbine 12 and/or the generator 14 to experience undesirable oscillations that may lead to system 10 transient and/or dynamic instability. Such transient and/or dynamic instability may cause the generator 14, as well as the turbine 12 and exciter 16, to transition from a steady-state operating point to a transient and/or dynamic operating point. Specifically, frequency deviations on the power grid 26 may cause generator 14 rotor angle swings (e.g., power angle oscillations) throughout the power system 10. Moreover, because conventional power system stabilizer (CPSS) systems (e.g., systems used to damp the generator 14 rotor angle oscillations) that may be generally configured according to linear, fixed parameters, the CPSS systems, unlike the mechanical power system stabilizer MPSS techniques described herein, may mechanically change the behavior of the turbine system 12 to account for transient events and to prevent continuous operations of the power generating system 10 without trips.

As will be discussed in further detail below, in certain embodiments, the controller 32 may include a mechanical power system stabilizer (MPSS) system 40 (shown in FIG. 2) that may be implemented to dynamically and adaptively regulate the gas turbine system 12 and thus (e.g., dynamically and adaptively damp) power frequency oscillations of, for example, the rotor of the generator 14. The MPSS may thus enhance the ability of the system 10 to continue operations through the transient conditions without tripping.

Figure 2:
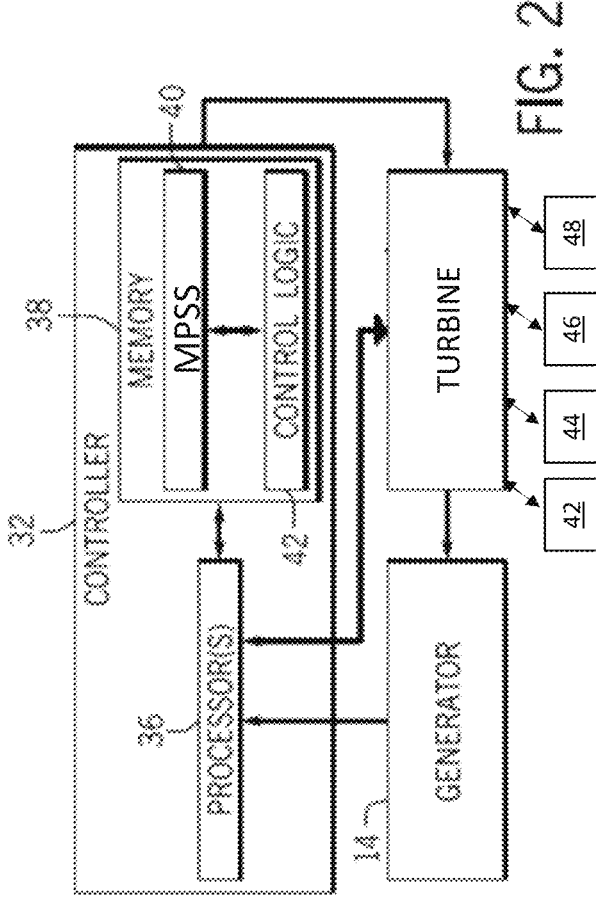
FIG. 2 is a schematic diagram of an embodiment of a control system included in the system of FIG. 1 including a mechanical power system stabilizer (MPSS), in accordance with present embodiments.

Turning now to FIG. 2, the figure illustrates a detailed block diagram of an embodiment of the controller 32 included in the power production system 10 (shown in FIG. 1). As generally illustrated, the controller 32 may include one or more processors 36 and a memory 38, which may be used collectively to support an operating system, software applications and systems, and so forth, useful in implementing the techniques described herein. Particularly, the controller 32 may include code or instructions stored in a non-transitory machine-readable medium (e.g., the memory 38 and/or other storage) and executed, for example, by the one or more processors 36 that may be included in the controller 32. The processor 36 may receive various generator 14 operating state parameters (e.g., terminal voltage, real power (P), reactive power (Q), power factor, frequency, and so forth) and/or turbine system 12 operating parameters (e.g., turbine speed, load (e.g., in megawatts), firing temperature, pressures, clearances (e.g., between rotating and stationary components), fuel flows (e.g., flow of fuel and/or oxidizers such as air), valve positions, and so on), which may be used by the MPSS system 40 to control (e.g., via the one or more processors 36) operating parameters, for example, used to control throttle valves 42, inlet guide vanes 44, blow out valves 46, and other actuators 48) of the turbine system 12.

For example, as previously discussed above with respect to FIG. 1, under certain loading conditions (e.g., due to load demand changes on the power grid 26), the turbine 12, the generator 14, as well as other components that may be included within the power generating system 10 may be susceptible to transient and dynamic instability. In particular, power grid 26 transient conditions may cause generator 14 rotor angle swings (e.g., oscillations) or other transient related issues. Accordingly, the MPSS system 40 (e.g., executed via the one or more processors 36) may be used to provide mechanical adjustments by controlling turbine system 12 operations.

In certain embodiments, the MPSS system 40 may be a software system, or in other embodiments, a combination of software and hardware that may be used to generate appropriate operating parameters of the turbine system 12 based on, for example, real power (P) (e.g., MW), reactive power (Q) (e.g., kVar), power factor, frequency, terminal voltage), turbine speed, turbine load, turbine pressures (e.g., compressor pressures, exhaust pressures), liquid flows (e.g., flow of air as an oxidizer, diesel, syngas, gasoline, methane gas, hydrocarbonic fuels, and so forth). The MPSS system 40 may thus enable the power system 10 to provide mechanical adjustments suitable for transient operations.

Figure 3:
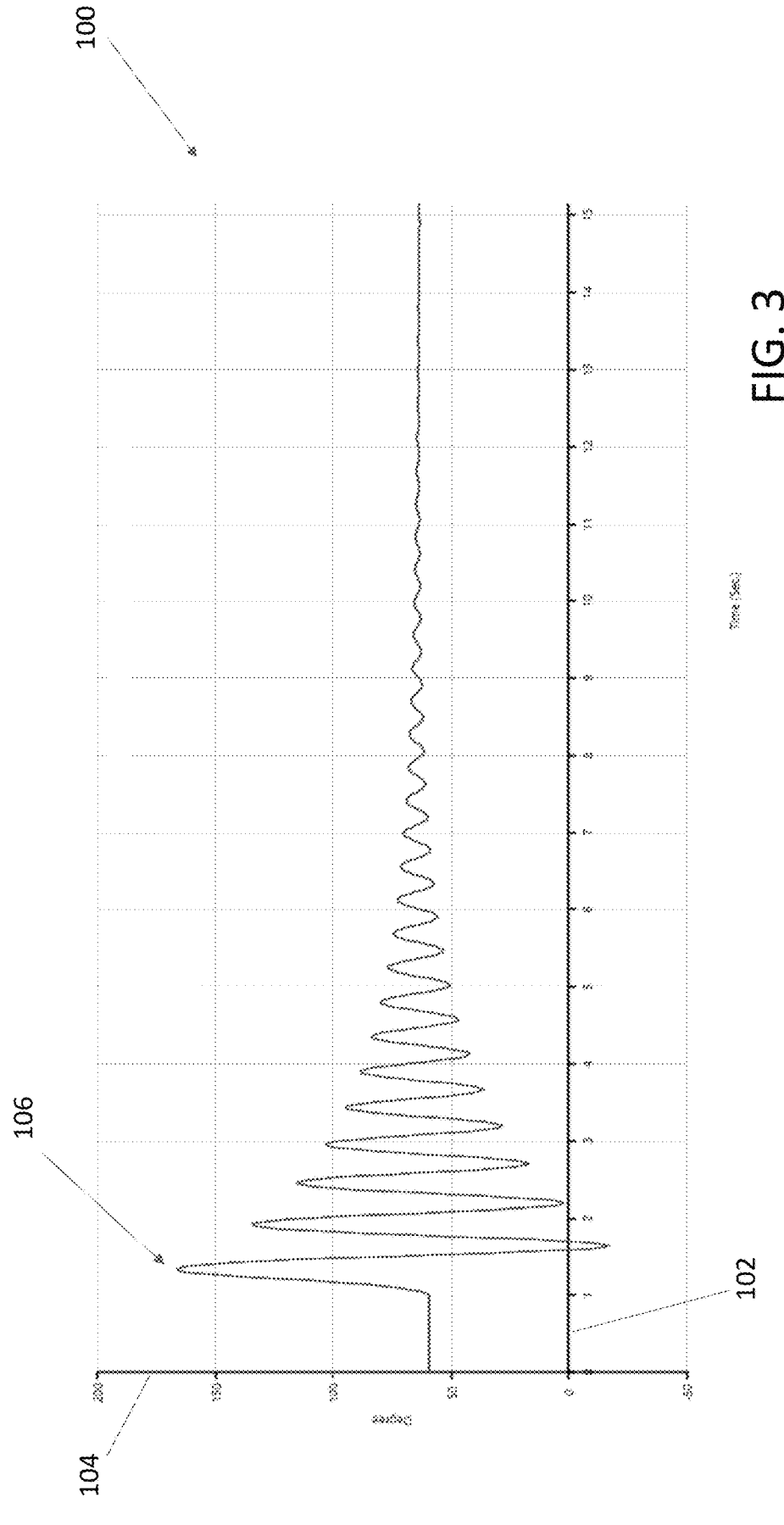
FIG. 3 is a graph illustrating power angle oscillations of the generator system of FIG. 2, in accordance with present embodiments.

FIG. 3 shows a graph 100 having an X axis 102 representative of increasing time and a Y axis 104 representative of generator 14 rotor angle in degrees. During a transient event, the generator 14 may experience loss of synchronicity. For example, a rotor angle may change, leading to power output frequency changes. The depicted embodiment shows the rotor angle peaking at position 106. This first peak is included in an example of a first transient swing, e.g., a swing up.

In some cases, the first transient swing may lead to a trip. That is, the change in rotor angle and/or associated issues may cause certain systems, such as the excitation system 24 and/or the controller 32, to initiate a shutdown of the power system 10 and systems included therein. The techniques described herein may quickly detect the first transient swing 126. For example, the excitation system 24 may be an excitation controller system, such as the EX2100e™ regulator, available from General Electric Co. of Schenectady, New York, that includes transient detection logic that may detect the first transient swing in 50 milliseconds (ms) or less. The techniques described herein may use the fast transient detection to then mechanically adjust the power production system 10 or certain systems (e.g., gas turbine system 12) of the power production system 10 to minimize or prevent loss of synchronicity.

Figure 4:
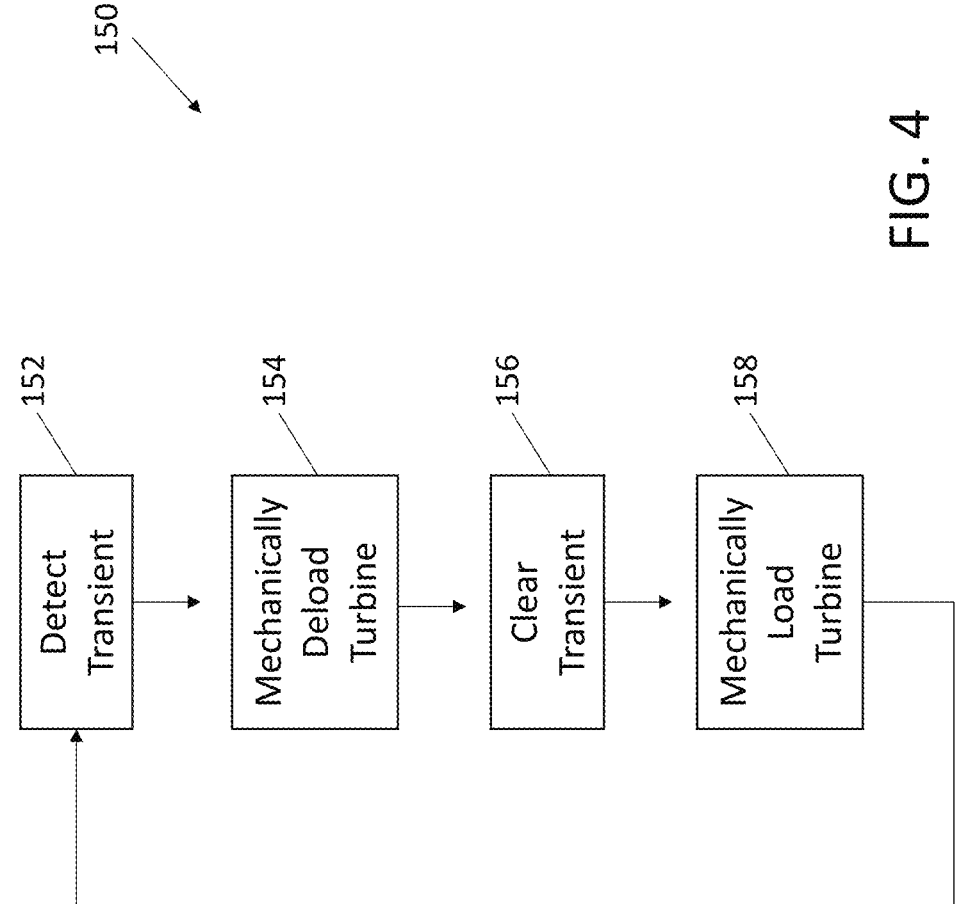
FIG. 4 is a flowchart illustrating an embodiment of a process suitable for applying the MPSS system of FIG. 2, in accordance with present embodiments.

FIG. 4 is a flowchart of an embodiment of a process 150 suitable for mechanically adjusting the gas turbine system 12, for example, during transient conditions of the power grid 26. The process 150 may be stored as computer instructions in the memory 38 and be executed by the processor(s) 36. In the depicted embodiment, the process 150 may detect (block 152) transient conditions. For example, the excitation system 34 may include one or more sensors, such as voltage sensors, electrical current sensors, inductance sensors, capacitance sensors, and the like, that detect the first transient swing shown in FIG. 3. In some cases, the detection may take less than 50 ms, for example, an average of 30-40 ms.

The process 150 may then mechanically deload (block 154) the gas turbine system 12. For example, the process 150 may adjust throttle valves 42 to lower fuel intake to the gas turbine 12. Other adjustments may include adjusting inlet guide vanes 44 or similar compressor section vanes, blow out valves 46, and/or other actuators 48 (e.g., pumps, solenoids, switches) to quickly lower power production by the gas turbine 12. In some cases, power production may be lowered between 150 megawatts (MW) per second to 250 MW per second.

In some embodiments, a "Zonker" logic may be used as part of the deloading of the gas turbine system 12 when the controller 32 is a Mark series controller available from General Electric Co. of Schenectady, New York. Other controllers may use similar trip logic. For example, Zonker logic may be used during gas turbine operations to trip the gas turbine system 12. However, the process 150 may use Zonker logic (or other trip logic) without tripping or shutting down the gas turbine system 12. For example, the fuel throttle valve 42 may be set to a minimum operating value (as per manufacturer's recommendations), high speed vents may empty fuel in manifolds via actuators 48, and high pressure bleeds and/or freezing of compressor guide vanes may increase compressor loads in a compressor section of the gas turbine system 12 to reduce shaft power without "flaming out" or otherwise causing combustion of fuel to stop in the gas turbine system 12. Accordingly, the gas turbine system 12 may be deloaded (block 154) quickly (e.g., between 150 MW to 250 MW per second or more) without flameouts.

The deloaded gas turbine system 12 may then continue operations during the transient event, thus clearing (block 156) the transient. In some embodiments, the transient may be cleared as per regulations. That is, certain regulatory codes may specify that the power production system 10 continue operations during transients, for example caused by 3-phase shorts in the power grid 26, for a specified amount of time (e.g., 1 to 30 seconds). It is to be understood that the power production system 10 may be one of many power production systems in a power plant. For example, 1, 2, 3, 4, 5, or more power production systems 10 may be electrically coupled to the power grid 26 and used to deliver electric power to the power grid 26.

Once the transient is cleared, the process 150 may then mechanically load (block 158) the gas turbine system 12. For example, the process 150 may reverse the deloading (block 154) by opening up the throttle valve(s) 42, adding oxidizer via vanes 44, closing blow out valve(s) 46, and/or manipulating actuators 48 to cause the gas turbine system 12 to provide more power, thus increasing the electrical power production of the power production system 10. In this manner, the techniques described herein may provide for mechanical adjustments suitable for overcoming certain transient conditions.

Figure 5:
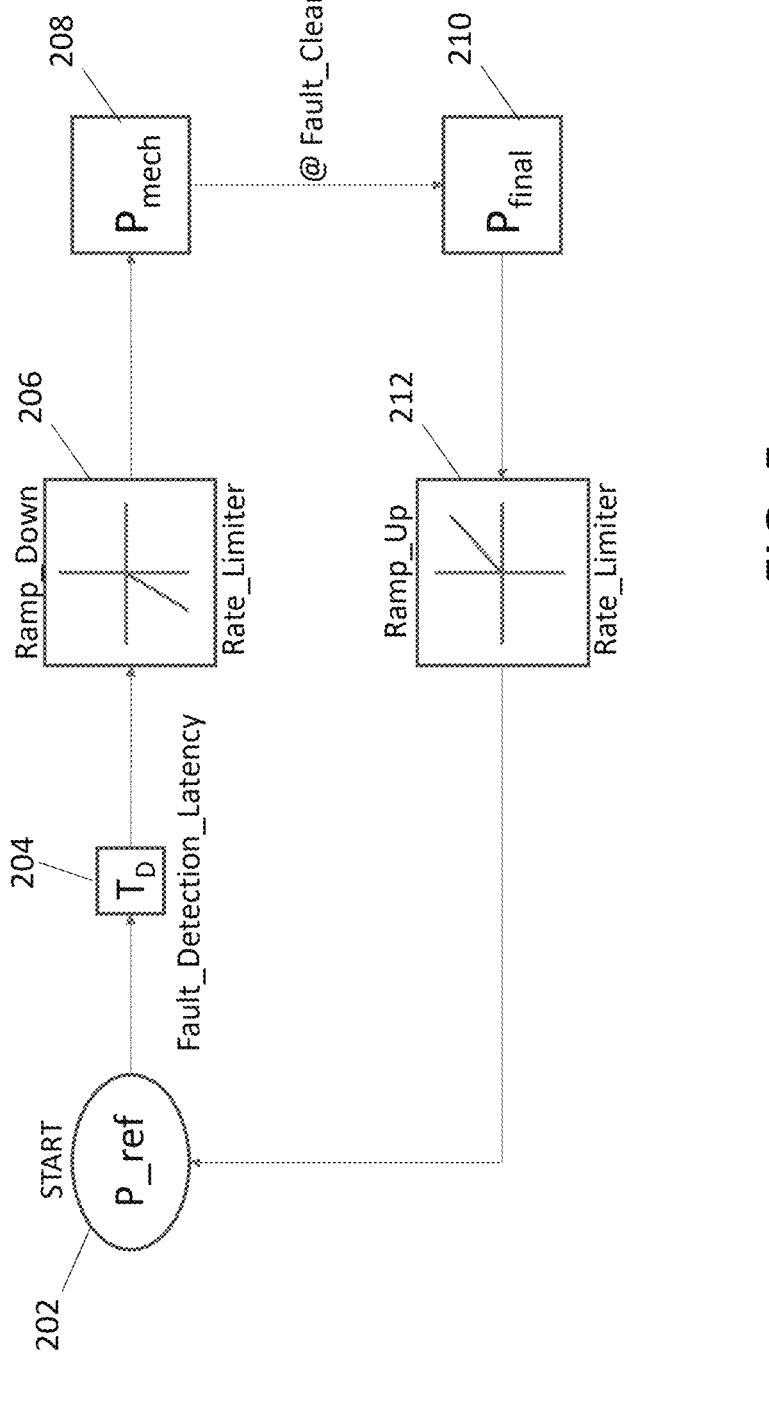
FIG. 5 is a flowchart illustrating further details of the process suitable for applying the MPSS system of FIG. 2, in accordance with present embodiments.

FIG. 5 is a flowchart of further details of the process 150 showing a process 200 that me be used to deload and reload the gas turbine system 10. The process 200 may be stored as computer instructions in the memory 38 and be executed by the processor(s) 36. In the depicted embodiment, the process 200 may begin (block 202) by setting a mechanical power reference value (P_ref). For example, P_ref may be set to 1.0 per unit. As the transient condition (e.g., first transient swing) is detected, a detection latency $T_D$ (block 204) may occur. The detection latency $T_D$ may be between 20-50 ms or on average approximately 30-40 ms. The process 200 may then ramp down (block 206) power production of the gas turbine system 12.

In some embodiments, a ramp down rate may be used, such as a ramp down rate of −5.0 per unit. As mentioned earlier, the ramp down block (206) may include setting the fuel throttle valve 42 to a minimum operating value (as per manufacturer's recommendations), emptying fuel in manifolds via high speed vents by using actuators 48, using high pressure bleeds and/or freezing of compressor guide vanes to increase compressor loads in a compressor section of the gas turbine system 12 to reduce shaft power without "flaming out" or otherwise causing combustion of fuel to stop in the gas turbine system 12. Accordingly, the gas turbine system 12 may be ramped down (block 206).

Accordingly, a mechanical power ($P_{mech}$) 208 may be achieved, suitable for deloaded operations of the gas turbine system 12 during transient conditions. As the fault condition is cleared, a final mechanical power ($P_{final}$) 210 may be arrived at. The $P_{final}$ may thus be representative of power when the gas turbine system may then be ready to be loaded or ramped up. Accordingly, the process 200 may then ramp up (block 212) the gas turbine system. For example, a ramp up rate of 5.0 per unit may be used to ramp up the gas turbine system 12. The process may then iterate to block 202. By quickly deloading the gas turbine system 12 during a transient (e.g., first swing transient), the techniques described herein may more easily enable the power production system 10 to continue operations as per regulations during certain power grid undesired events (e.g., three-phase shorts).

Technical effects of the disclosed embodiments include a power production system having a gas turbine system connected to an electrical generator. The electrical generator provides electric power to a power gird. When transient events occur because of certain grid conditions, a controller may deload the gas turbine to account for the transient event and then reload the gas turbine after the transient event is finished. Accordingly, mechanical adjustments may result in a mechanical power reduction that better maintains synchronicity.

The subject matter described in detail above may be defined by one or more clauses, as set forth below.

A system includes a control system. The control system includes a memory that stores a mechanical power system stabilizer (MPSS) system configured to dynamically stabilize an operation of a generator system by adjusting a gas turbine system, wherein the generator system is mechanically coupled to the gas turbine system. The control system includes a processor connected to the memory and configured to execute the MPSS system so that the MPSS system detects a transient event caused by a power grid that is electrically coupled to the generator system. The MPSS system also mechanically deloads the gas turbine system, waits until a clearing time has elapsed, and mechanically loads the gas turbine system:

The system of any preceding clause, wherein the processor is configured to execute the MPSS to attenuate an oscillation of a power angle of the generator system by the mechanically deload of the gas turbine system.

The system of any preceding clause, wherein the processor is configured to detect the transient event by using an excitation system electrically coupled to the generator system.

The system of any preceding clause, wherein the excitation system comprises an automatic voltage regulator (AVR) for automatically maintaining output terminal voltage of the generator system at a set value under varying load and operating temperatures.

The system of any preceding clause, wherein the transient event comprises a first swing transient event representative of a first change in a power angle of the generator system.

The system of any preceding clause, wherein the processor is configured to deload the gas turbine system by modulating a blow out valve.

The system of any preceding clause, wherein the processor is configured to deload the gas turbine system by using a trip logic to quickly reduce power production of the gas turbine system.

The system of any preceding clause, wherein the processor is configured to deload the gas turbine system while preventing a flame out of the gas turbine system.

The system of any preceding clause, wherein the clearing time comprises a time set by a regulatory authority.

The system of any preceding clause, wherein the gas turbine system comprises an aeroderivative gas turbine.

A non-transitory computer-readable medium having computer executable code stored thereon, the code comprising instructions to execute a mechanical power system stabilizer (MPSS) system configured to dynamically stabilize an operation of a generator system by adjusting a gas turbine system, wherein the generator system is mechanically coupled to the gas turbine system. The MPSS system detects a transient event caused by a power grid that is electrically coupled to the generator system. The MPSS system also mechanically deloads the gas turbine system, waits until a clearing time has elapsed, and mechanically loads the gas turbine system.

The non-transitory computer-readable medium of any preceding clause, wherein the MPSS system is configured to attenuate an oscillation of a power angle of the generator system by the mechanically deload of the gas turbine system.

The non-transitory computer-readable medium of any preceding clause, wherein the MPSS system is configured to detect the transient event by using an excitation system electrically coupled to the generator system.

The non-transitory computer-readable medium of any preceding clause, wherein the transient event comprises a first swing transient event representative of a first change in a power angle of the generator system.

The non-transitory computer-readable medium of any preceding clause, wherein the MPSS system is configured to deload the gas turbine system by modulating a blow out valve, by using a trip logic to quickly reduce power production of the gas turbine system, or a combination thereof.

A system includes a gas turbine system configured to convert a fuel into rotative power, and a gas generator system mechanically coupled to the gas turbine system and configured to generate an electric power based on the rotative power. The system further includes a gas turbine controller. The gas turbine controller is configured to detect a transient event caused by a power grid that is electrically coupled to the generator system, and to mechanically deload the gas turbine system. The gas turbine controller is further configured to wait until a clearing time has elapsed and to mechanically load the gas turbine system The system of any preceding clause, wherein the controller is configured to attenuate an oscillation of a power angle of the generator system by the mechanically deload of the gas turbine system.

The system of any preceding clause, wherein the controller is configured to detect the transient event by using an excitation system electrically coupled to the generator system.

The system of any preceding clause, wherein the transient event comprises a first swing transient event representative of a first change in a power angle of the generator system.

The system of any preceding clause, wherein the controller is configured to deload the gas turbine system by modulating a blow out valve, by using a trip logic to quickly reduce power production of the gas turbine system, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a control system, comprising:
a memory configured to store a mechanical power system stabilizer (MPSS) system configured to dynamically stabilize an operation of a generator system by adjusting a gas turbine system, wherein the generator system is mechanically coupled to the gas turbine system; and
a processor communicatively coupled to the memory and configured to execute the MPSS to:
detect a first swing transient event of a transient event caused by a power grid that is electrically coupled to the generator system, wherein the first swing transient event comprises a first change leading to a first peak in a power angle of the generator system;
mechanically deload the gas turbine system in response to detection of the first swing transient event;
wait until a clearing time has elapsed; and
mechanically load the gas turbine system.

2. The system of claim 1, wherein the processor is configured to execute the MPSS to attenuate an oscillation of the power angle of the generator system by the mechanically deload of the gas turbine system to overcome the transient condition in a time period of less than 10 seconds.

3. The system of claim 2, wherein the processor is configured to execute the MPSS to attenuate the oscillation to overcome the transient condition in the time period of less than 5 seconds.

4. The system of claim 1, wherein the processor is configured to execute the MPSS to detect the transient event by using an excitation system electrically coupled to the generator system, and the excitation system comprises an automatic voltage regulator (AVR) for automatically maintaining output terminal voltage of the generator system at a set value under varying load and operating temperatures.

5. The system of claim 1, wherein the processor is configured to execute the MPSS to initiate the mechanically deload during the first swing transient event.

6. The system of claim 1, wherein the processor is configured to deload the gas turbine system by modulating a blow out valve.

7. The system of claim 6, wherein the processor is configured to deload the gas turbine system by using a trip logic to quickly reduce power production of the gas turbine system.

8. The system of claim 1, wherein the processor is configured to deload the gas turbine system while preventing a flame out of the gas turbine system.

9. The system of claim 1, wherein the processor is configured to execute the MPSS to detect the first swing transient event with a detection latency of less than or equal to 50 milliseconds.

10. The system of claim 1, wherein the gas turbine system comprises an aeroderivative gas turbine.

11. A non-transitory computer-readable medium having computer executable code stored thereon, the code comprising instructions to:
execute a mechanical power system stabilizer (MPSS) system configured to dynamically stabilize an operation of a generator system by adjusting a gas turbine system, wherein the generator system is mechanically coupled to the gas turbine system, and wherein the MPSS system when executed is configured to:
detect a first swing transient event of a transient event caused by a power grid that is electrically coupled to the generator system, wherein the first swing transient event comprises a first change leading to a first peak in a power angle of the generator system;

mechanically deload the gas turbine system in response to detection of the first swing transient event;

wait until a clearing time has elapsed; and mechanically load the gas turbine system.

12. The non-transitory computer-readable medium of claim 11, wherein the MPSS system is configured to attenuate an oscillation of the power angle of the generator system by the mechanically deload of the gas turbine system to overcome the transient condition in a time period of less than 10 seconds.

13. The non-transitory computer-readable medium of claim 11, wherein the MPSS system is configured to detect the transient event by using an excitation system electrically coupled to the generator system, and the excitation system is separate from an exciter coupled to the generator system.

14. The non-transitory computer-readable medium of claim 11, wherein the MPSS system is configured to detect the first swing transient event with a detection latency of less than or equal to 50 milliseconds and/or initiate the mechanically deload during the first swing transient event.

15. The non-transitory computer-readable medium of claim 11, wherein the MPSS system is configured to deload the gas turbine system by modulating a blow out valve, by using a trip logic to quickly reduce power production of the gas turbine system, or a combination thereof.

16. A system, comprising:

a gas turbine system configured to convert a fuel into rotative power;

a gas generator system mechanically coupled to the gas turbine system and configured to generate an electric power based on the rotative power; and a gas turbine controller configured to:

detect a first swing transient event of a transient event caused by a power grid that is electrically coupled to the generator system, wherein the first swing transient event comprises a first change leading to a first peak in a power angle of the generator system;

mechanically deload the gas turbine system in response to detection of the first swing transient event;

wait until a clearing time has elapsed; and mechanically load the gas turbine system.

17. The system of claim 16, wherein the gas turbine controller is configured to attenuate an oscillation of the power angle of the generator system by the mechanically deload of the gas turbine system to overcome the transient condition in a time period of less than 10 seconds.

18. The system of claim 16, wherein the gas turbine controller is configured to detect the transient event by using an excitation system electrically coupled to the generator system.

19. The system of claim 16, wherein the gas turbine controller is configured to detect the first swing transient event with a detection latency of less than or equal to 50 milliseconds.

20. The system of claim 16, wherein the gas turbine controller is configured to deload the gas turbine system by modulating a blow out valve, by using a trip logic to quickly reduce power production of the gas turbine system, or a combination thereof.

* * * * *